(12) United States Patent
Quinebeche et al.

(10) Patent No.: US 8,653,192 B2
(45) Date of Patent: Feb. 18, 2014

(54) METHOD FOR MANUFACTURING A POLYESTER COMPOSITION HAVING IMPROVED IMPACT PROPERTIES

(75) Inventors: Sebastien Quinebeche, Bernay (FR); Alexander Korzhenko, Pau (FR); Alain Bouilloux, Saint-Leger de Rotes (FR); Stephane Girois, Norfolk, VA (US)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 13/383,533

(22) PCT Filed: Jul. 13, 2010

(86) PCT No.: PCT/FR2010/051473
§ 371 (c)(1),
(2), (4) Date: Mar. 29, 2012

(87) PCT Pub. No.: WO2011/007093
PCT Pub. Date: Jan. 20, 2011

(65) Prior Publication Data
US 2012/0271004 A1  Oct. 25, 2012

(30) Foreign Application Priority Data

Jul. 17, 2009 (FR) .................................... 09 54956
Feb. 15, 2010 (FR) .................................... 10 51020

(51) Int. Cl.
*C08L 67/04* (2006.01)
*C08L 67/03* (2006.01)
*C08L 63/00* (2006.01)
*C08L 33/12* (2006.01)
*B29C 47/10* (2006.01)

(52) U.S. Cl.
USPC .............................. 525/190; 525/166; 525/902

(58) Field of Classification Search
USPC ........................................ 525/166, 190, 902
See application file for complete search history.

(56) References Cited

U.S. PATENT DOCUMENTS

| 3,287,443 A | 11/1966 | Saito et al. |
| 3,657,391 A | 4/1972 | Curfman |
| 3,808,180 A | 4/1974 | Owens |
| 3,985,704 A | 10/1976 | Jones et al. |
| 4,096,180 A | 6/1978 | Kollonitsch |
| 4,096,202 A | 6/1978 | Farnham et al. |
| 4,180,494 A | 12/1979 | Fromuth et al. |
| 4,260,693 A | 4/1981 | Liu |
| 4,299,928 A | 11/1981 | Witman |
| 4,617,366 A | 10/1986 | Gloriod et al. |
| 4,644,044 A | 2/1987 | Gloriod et al. |
| 4,753,980 A * | 6/1988 | Deyrup .......................... 524/369 |
| 5,854,346 A | 12/1998 | Meyer et al. |
| 6,476,145 B1 | 11/2002 | Perret et al. |
| 6,809,151 B1 | 10/2004 | Lacroix et al. |
| 7,022,768 B1 | 4/2006 | Lacroix et al. |
| 7,119,152 B1 | 10/2006 | Lacroix et al. |
| 2005/0131120 A1* | 6/2005 | Flexman ........................ 524/399 |

FOREIGN PATENT DOCUMENTS

| EP | 0 491 985 A1 | 1/1992 |
| EP | 1 104 784 A1 | 6/2001 |
| EP | 1 104 785 A1 | 6/2001 |
| EP | 0 963 412 B1 | 6/2004 |
| FR | 2 498 609 | 7/1982 |
| FR | 2 569 411 | 2/1986 |
| FR | 2 569 412 | 2/1986 |
| GB | 2 091 745 A | 8/1982 |
| WO | WO 99/33917 A1 | 7/1999 |
| WO | WO 01/38437 A1 | 5/2001 |

OTHER PUBLICATIONS

International Search Report issued in PCT/FR2010/051473, Dec. 28, 2010, Office Européen des Brevets, Rijswijk, NL, 6 pages.

* cited by examiner

*Primary Examiner* — Fred M Teskin
(74) *Attorney, Agent, or Firm* — Buchanan Ingersoll & Rooney P.C.

(57) ABSTRACT

A method for manufacturing a thermoplastic composition including: a polyester resin (c); a mixture including a copolymer (a) of an α-olefin and of a monomer having an ethylenic unsaturation and an epoxy function, as well as a core-shell compound (b); characterized in that said method includes a first step of manufacture the mixture of (a) and (b) by extrusion at a temperature at which the copolymer (a) is in the molten state and at a maximum temperature of 60 to 180° C.; a second step of manufacturing the thermoplastic composition by extrusion or by mixing the polyester resin (c) with the mixture of (a) and (b) produced in the first step.

18 Claims, No Drawings

METHOD FOR MANUFACTURING A POLYESTER COMPOSITION HAVING IMPROVED IMPACT PROPERTIES

FIELD OF THE INVENTION

The invention also relates to a process for manufacturing a polyester composition with improved impact properties. It also relates to novel polyester compositions that may be obtained via this process.

PRIOR ART

Polyesters have excellent dimensional stability, thermal resistance or chemical resistance properties that enable them to be used in the wrapping, electrical or electronic fields. However, in the course of the transformation operations, a decrease in the molecular weight of the polyester may occur, leading to a decrease in the impact properties.

To improve the impact properties, an impact modifier may be used, such as a copolymer of ethylene and of an unsaturated epoxide. For example, document EP963412 discloses parts injected with polyester comprising a copolymer of ethylene and of an unsaturated epoxide of particular melt flow index. These parts are made from a composition whose viscosity allows them to be readily extruded.

U.S. Pat. No. 5,854,346 discloses an aromatic polyester composition comprising a copolymer of ethylene and of an unsaturated epoxide and a core-shell impact modifier. In the described process, the constituents are introduced separately into the polyester.

Although these compositions have improved impact properties, the impact properties may in certain cases prove to be insufficient.

Furthermore, it is necessary for extruded or injected polyester compositions to have viscosity properties that allow them to be readily processed.

Moreover, core-shell compounds are in pulverulent form and their direct use in the polyester is impractical and may lead to aggregation of the core-shell compounds under certain process conditions.

In addition, the manufacture of the composition is performed at high temperature, i.e. generally at a temperature above 180° C.: processing tooling set at high temperature, for example an extruder, is used, and the various constituents of the composition are generally fed continuously via hoppers that are in contact with the processing apparatus. However, when the feed hoppers are in contact with the apparatus, heat is transmitted from the extruder to the hoppers, which leads to an increase in the temperature of the various constituents present in the hoppers. The copolymer of ethylene and of an unsaturated epoxide may then become tacky, which may clog the extruder feed.

There is thus a need to find a process that can solve at least one of the problems presented above.

SUMMARY OF THE INVENTION

This is precisely the subject of the present invention, which relates to a process for manufacturing a thermoplastic composition comprising:
   a polyester resin (c);
   a copolymer (a) of an α-olefin and of an ethylenically unsaturated monomer bearing an epoxy function;
   and a core-shell compound (b);
characterized in that this process comprises:

a first step of manufacture by extrusion of a mixture comprising (a) and (b) at a temperature at which the copolymer (a) is molten and at a maximum temperature that is within the range from 60 to 180° C.;
   a second step of manufacturing the thermoplastic composition by extrusion or by mixing the polyester resin (c) with the mixture (a) and (b) obtained in the first step.

By performing such a process, the impact behavior of the polyester composition is surprisingly improved when compared with the prior art compositions in which such a first mixing is not performed. Furthermore, the viscosity of the polyester composition obtained allows easy transformation of the polyester composition, for example by injection. The implementation problems obtained when the copolymer (a) and/or the core-shell compound (b) are introduced directly into the polyester are also solved.

A subject of the invention is also a composition that may be obtained via this process, and also via one of the various modes of the invention presented below, these modes being taken alone or in combination with each other.

The step of manufacturing the mixture (a) and (b) of the first step is advantageously performed such that the maximum temperature is within the range from 70 to 140° C.

According to one embodiment, the step for manufacturing the mixture (a) and (b) of the first step is performed by mixing in molten form in a co-rotating twin-screw extruder or a counter-rotating twin-screw extruder or a co-kneader or an internal mixer or a single-screw extruder, preferentially in a single-screw extruder. It is understood that all the steps for manufacturing the mixture (a) and (b), including a mixture in molten form, are considered herein as extrusions.

Preferentially, the residence time of the mixture (a) and (b) of the first step is within the range from 10 to 300 seconds.

The second step for manufacturing the mixture with the polyester resin (c) may be performed such that the temperature of the mixture is within the range from 180 to 320° C. This second step is performed by mixing in molten form in a co-rotating twin-screw extruder or a counter-rotating twin-screw extruder or a co-kneader or an internal mixer or a single-screw extruder, preferentially in a co-rotating twin-screw extruder.

The ratio (a)/(b) is advantageously within the range from 1/9 to, 9/1 and preferentially from 1/4 to 1.5/1.

The composition may comprise, relative to its total mass, from 20% to 99%, for example from 50% to 97%, by mass of polyester resin (c) and from 1% to 80%, for example from 3% to 50%, by mass of the mixture (a) and (b).

The polyester resin (c) may, according to a first variant of the invention, be chosen from polyethylene terephthalate (PET), polybutylene terephthalate (PBT) and the copolyester of ethylene glycol, cyclohexanedimethanol and terephthalic acid (PETG).

The polyester resin (c) may, according to a second variant of the invention, be chosen from polyhydroxyalkanoate (PHA) and poly(lactic acid) (PLA).

According to one embodiment, part of the polyester of the resin (c) is substituted with polycarbonate. According to this mode, the term "polyester resin (c)" means a mixture of polycarbonate and of polyester.

The copolymer (a) and the compound (b) may be cold-premixed before the step for manufacturing the mixture ((a) and (b)).

The shell part of the core-shell compound (b) may comprise in polymerized form:
   an alkyl methacrylate whose alkyl chain comprises from 1 to 12 and preferably from 1 to 4 carbon atoms;

and/or a vinyl aromatic organic compound comprising from 6 to 12 carbon atoms, such as styrene;
and/or acrylonitrile;
this shell part possibly being crosslinked.

The core part of the core-shell compound (b) may comprise in polymerized form:
a conjugated diene comprising from 4 to 12 and preferably from 4 to 8 carbon atoms;
or an alkyl acrylate whose alkyl chain comprises from 1 to 12 and preferably from 1 to 8 carbon atoms;
this core part possibly being crosslinked.

Advantageously, the core-shell compound (b) is chosen from:
a compound with a core comprising butadiene and a shell comprising methyl methacrylate or a mixture of methyl methacrylate and styrene;
a compound with a core comprising 2-ethylhexyl acrylate and a shell comprising methyl methacrylate or a mixture of methyl methacrylate and styrene;
a compound with a core comprising butadiene and a shell comprising a mixture of acrylonitrile and styrene.

According to one mode, the compound (b) has a core comprising butadiene and a shell comprising methyl methacrylate or a mixture of methyl methacrylate and of styrene and the polyester resin (c) comprises PBT.

According to another mode, the compound (b) has a core comprising 2-ethylhexyl acrylate and a shell comprising methyl methacrylate or a mixture of methyl methacrylate and of styrene and the polyester resin (c) comprises PLA.

The ratio of the mass of the shell to the mass of the core is, for example, within the range from 1:1 to 20:1.

The ethylenically unsaturated monomer bearing an epoxy function is preferentially glycidyl methacrylate.

The copolymer (a) may be chosen advantageously from the copolymer of ethylene and glycidyl methacrylate and the copolymer of ethylene, an alkyl (meth)acrylate and glycidyl methacrylate.

The invention also relates to a composition that may be obtained via the process according to the invention.

The thermoplastic composition obtained by means of the process according to the present invention may consist of a polyhydroxyalkanoic (PHA) acid composition comprising an elastomeric compound of core-shell type and an olefinic copolymer comprising an ethylenic monomer bearing an epoxy function.

Other optional advantageous characteristics of the thermoplastic composition are defined below:
the ethylenic monomer bearing an epoxy function is glycidyl (meth)acrylate;
the olefinic copolymer is a copolymer of ethylene, of glycidyl methacrylate and optionally of an alkyl (meth) acrylate in which the alkyl chain comprises from 1 to 30 carbon atoms;
the thermoplastic composition also comprises an additional olefinic polymer other than olefinic copolymers comprising an ethylenic monomer bearing an epoxy function, this olefinic polymer being a copolymer of ethylene and of an alkyl (meth)acrylate, a copolymer of ethylene and of a vinyl ester of an acid or an ionomer, preferentially a copolymer of ethylene and of an alkyl acrylate with an alkyl chain ranging from 1 to 20, for instance methyl acrylate, ethylene acrylate or n-butyl acrylate;
the core polymer of the core-shell compound has a glass transition temperature of less than 20° C. and the polymer of the shell has a glass transition temperature of greater than 20° C.;
the mass quantity of core is within the range from 60% to 95% of the total mass of the core-shell compound;
the size of the core-shell compounds is between 50 and 600 nm (nanometers);
the PHA is chosen from polylactic acid (PLA) and polyglycolic acid (PGA).

The thermoplastic composition obtained via the process according to the invention makes it possible to prepare all or part of a component or object, such as wrapping; this component/object being manufactured via a step of forming the composition, for example by injection, pressing or calendering, said component or said object optionally undergoing an annealing step.

DETAILED DESCRIPTION OF THE INVENTION

The invention relates to a process for manufacturing a thermoplastic composition comprising a copolymer (a) of an α-olefin and of an ethylenically unsaturated monomer bearing an epoxy function, a core-shell compound (b) and a polyester resin (c).
Copolymer (a)

The copolymer (a) may comprise, relative to its total mass, from 99.9% to 40% and advantageously from 83.5% to 55% by mass of α-olefin.

The copolymer (a) may comprise, relative to its total mass, from 0.1% to 15% and advantageously from 1.5% to 10% by mass of ethylenically unsaturated monomer bearing an epoxy function.

According to one mode of the invention, the copolymer (a) comprises an ethylenically unsaturated monomer not bearing an epoxy function, which is other than an α-olefin. The copolymer (a) may comprise, relative to its total mass, from 0% to 45% and advantageously from 15% to 35% by mass of this monomer.

According to the invention, the amounts of the various monomers present in constituents (a) and (b) may be measured by infrared spectroscopy using standard ISO 8985.

α-Olefins that may be mentioned include α-olefins comprising from 2 to 6 carbon atoms, such as ethylene or propylene. Ethylene is preferred as α-olefin.

As examples of ethylenically unsaturated monomers bearing an epoxy function, mention may be made of aliphatic glycidyl esters and ethers such as allyl glycidyl ether, vinyl glycidyl ether, glycidyl maleate and itaconate, glycidyl (meth)acrylate, and alicyclic glycidyl esters and ethers such as 2-cyclohexene 1-glycidyl ether, cyclohexene-4,5-diglycidyl carboxylate, cyclohexene-4-glycidyl carboxylate, 5-norbornene-2-methyl-2-glycidyl carboxylate and endocisbicyclo(2,2,1)-5-heptene-2,3-diglycidyl dicarboxylate.

Glycidyl methacrylate is preferred as ethylenically unsaturated monomer bearing an epoxy function. As regards the ethylenically unsaturated monomer not bearing an epoxy function and being other than an α-olefin, the monomer may comprise up to 24 carbon atoms. Examples of monomers that may be mentioned include vinyl esters of a saturated carboxylic acid such as vinyl acetate, dienes, and alkyl acrylates or alkyl methacrylates, which are combined under the term alkyl (meth)acrylates in the present description.

Advantageously, the ethylenically unsaturated monomer not bearing an epoxy function and being other than an α-olefin is an alkyl (meth)acrylate. Those in which the alkyl chain comprises from 1 to 12, advantageously from 1 to 6 or even from 1 to 4 carbon atoms are preferred. Advantageously, the alkyl (meth)acrylates are n-butyl acrylate, isobutyl acrylate, 2-ethylhexyl acrylate, ethyl acrylate and methyl acrylate.

Preferentially, the alkyl (meth)acrylates are n-butyl acrylate, ethyl acrylate and methyl acrylate. It is most preferably methyl acrylate.

The melt flow index of the copolymer (a) according to the invention may be, for example, from 1 to 500 g/10 min, measured according to standard ASTM D 1238 at 190° C. and at 2.16 kg.

The copolymer (a) may be obtained by radical copolymerization of the various monomers. Use may be made of "radical polymerization" processes usually functioning at pressures of between 200 and 2500 bar. These processes are performed industrially using two main types of reactor: a reactor of autoclave type or a reactor of tubular type. These polymerization processes are known to those skilled in the art and use may be made, for example, of the processes described in documents FR 2 498 609, FR 2 569 411 and FR 2 569 412.

Core-Shell Compound (b)

As regards the core-shell compound (b), it is in the form of fine particles with an elastomeric core and at least, one thermoplastic shell, and the size of the particles is generally less than 1 μm and advantageously between 200 and 500 nm.

Examples of cores that may be mentioned include isoprene or butadiene homopolymers, copolymers of isoprene with not more than 30 mol % of a vinyl monomer other than isoprene, and copolymers of butadiene with not more than 30 mol % of a vinyl monomer other than butadiene. The vinyl monomer may be, for example, isoprene, butadiene, styrene, an alkylstyrene, acrylonitrile or an alkyl methacrylate.

Another family of cores is formed by homopolymers of an alkyl acrylate and copolymers of an alkyl acrylate with not more than 30 mol % of a vinyl monomer other than an alkyl acrylate, such as styrene, an alkylstyrene, acrylonitrile, butadiene or isoprene. The alkyl chain of the acrylate generally comprises from 2 to 20 carbon atoms. The alkyl acrylate is advantageously butyl acrylate or 2-ethylhexyl acrylate.

The core of the core-shell compound (b) may be totally or partially crosslinked. It suffices to add at least difunctional monomers during the preparation of the core, and these monomers may be chosen from poly(meth)acrylic esters of polyols such as butylene di(meth)acrylate and trimethylolpropane trimethacrylate. Other difunctional monomers are, for example, divinylbenzene, trivinylbenzene, vinyl acrylate and vinyl methacrylate.

The core may also be crosslinked by introducing therein, by grafting or as a comonomer during the polymerization, unsaturated functional monomers such as unsaturated carboxylic acid anhydrides, unsaturated carboxylic acids and unsaturated epoxides. Examples that may be mentioned include maleic anhydride, (meth)acrylic acid and glycidyl methacrylate.

The shell generally consists of a homopolymer of styrene, of an alkylstyrene or of an alkyl methacrylate such as methyl methacrylate. It may also consist of a copolymer comprising at least 70 mol % of one of these monomers with not more than 30 mol % of at least one different comonomer chosen from the other preceding monomers, vinyl acetate and acrylonitrile. Preferentially, a core-shell compound (b) having a shell comprising styrene or a core-shell compound (b) having a shell comprising methyl methacrylate is used.

Compound (b) may comprise more than one shell.

Examples of copolymers (b) and of processes for preparing them are described in the following patents: U.S. Pat. No. 4,180,494, U.S. Pat. No. 3,808,180, U.S. Pat. No. 4,096,202, U.S. Pat. No. 4,260,693, U.S. Pat. No. 3,287,443, U.S. Pat. No. 3,657,391, U.S. Pat. No. 4,299,928, U.S. Pat. No. 3,985,704.

It may be mentioned that as preferred compounds (b), the core-shell compound (b) is chosen from:
- a compound with a core comprising butadiene and a shell comprising methyl methacrylate or a mixture of methyl methacrylate (M) and of styrene (S) with a mole ratio (M)/(S) preferentially greater than or equal to 2.33;
- a compound with a core comprising an alkyl acrylate preferentially chosen from 2-ethylhexyl acrylate and n-butyl acrylate and a shell comprising methyl methacrylate or a mixture of methyl methacrylate and styrene with a mole ratio (M)/(S) of greater than or equal to 2.33;
- a compound with a core comprising butadiene and a shell comprising a mixture of acrylonitrile (A) and of styrene with a mole ratio (A)/(S) preferentially greater than or equal to 2.33.

Advantageously, the core represents from 60% to 90% by mass of the compound (b) and the shell represents from 40% to 10%.

The shell may be functionalized by introducing therein, by grafting or as comonomer during the polymerization, unsaturated functional monomers such as unsaturated carboxylic acid anhydrides, unsaturated carboxylic acids and unsaturated epoxides. Examples that may be mentioned include maleic anhydride, (meth)acrylic acid and glycidyl methacrylate.

Polyester Resin (c)

The term "polyester resin" (c) denotes polymers comprising repeating units of ester type. These are saturated products obtained by a condensation reaction of glycols and of dicarboxylic acids or derivatives thereof or by reaction of hydroxy acids or derivatives thereof, for example dimers thereof.

They may comprise the condensation products of aromatic dicarboxylic acids containing from 8 to 14 carbon atoms and of at least one aliphatic cyclic or acyclic glycol of formula $HO(CH_2)_nOH$ in which n is preferentially an integer ranging from 2 to 10.

The polyester may be synthesized from several diacids and/or several glycols: it is then referred to as a copolyester.

Up to 50 mol % of the aromatic dicarboxylic acid may be replaced with at least one different aromatic dicarboxylic acid, and/or up to 20 mol % may be replaced with an aliphatic dicarboxylic acid containing, for example, from 2 to 12 carbon atoms.

The polyester may comprise esters derived:
- from an aromatic 'dicarboxylic acid such as terephthalic acid, isophthalic acid, bibenzoic acid, naphthalenedicarboxylic acid, 4,4'-diphenylenedicarboxylic acid, bis(p-carboxyphenyl)methane acid, ethylenebis(p-benzoic acid), 1,4-tetramethylenebis(p-oxybenzoic acid), ethylenebis(para-oxybenzoic acid) and/or 1,3-trimethylenebis(p-oxybenzoic acid);
- and from a glycol such as ethylene glycol, 1,3-trimethylene glycol, 1,4-tetramethylene glycol, 1,6-hexamethylene glycol, 1,3-propylene glycol, 1,8-octamethylene glycol, 1,10-decamethylene glycol, neopentyl glycol and/or cyclohexanedimethanol.

The polyesters may be polyethylene terephthalate (PET), poly(1,4-butylene) terephthalate (PBT), 1,4-cyclohexylenedimethylene terephthalate (PCT), polytrimethylene terephthalate (PTT) or 1,4-cyclohexylenedimethylene isophthalate.

Examples of copolyesters that may be mentioned include polyethylene (terephthalate-co-isophthalate), poly(1,4-butylene terephthalate-co-isophthalate), 1,4-cyclohexylenedimethylene (terephthalate-co-isophthalate) and the copolyester of ethylene glycol, of cyclohexanedimethanol and of terephthalic acid, which is known by the abbreviation PETG.

As regards the polyester resin (c), it may comprise or consist of polyesters of renewable origin, i.e. polyesters obtained from starting materials of plant or animal and non-petrochemical origin:

polylactides: for example polymers and copolymers of lactic acid (PLA) or polymers and copolymers of glycolic acid (PGA), or poly(hydroxyalkanoate) homo- or copolymers (PHA): for example PHB poly(hydroxybutyrate), PHBV (copolymer of hydroxybutyrate-valerate, e.g.: poly(3-hydroxybutyrate)-poly(3-hydroxyvalerate)), PHBHx (copolymer of hydroxybutyrate-hexanoate), PHBO (hydroxybutyrate-hexanoate copolymer).

Among the polyesters of renewable origin, the PLAs may be chosen from the products of the brand name Natureworks® the company Cargill, of the brand name Ecoplastic® from the company Toyota or of the brand name Lacea® from the company Mitsui Chemical. Still among the polymers derived from renewable resources, the PHBVs may be chosen from the products of the brand name Biopol® (e.g.: Biopol® D600G) from the company Zeneca, products from the company Biomer or products from the company Métabolix.

The polyester may also be a copolyetherester, which is a copolymer containing polyester blocks and polyether blocks. The polyether units are derived from polyetherdiols such as polyethylene glycol (PEG), polypropylene glycol (PPG) or polytetramethylene glycol (PTMG), dicarboxylic acid units such as terephthalic acid and short chain-extending diol units such as glycol (ethanediol) or 1,4-butanediol. The sequence of the polyethers and diacids forms the flexible segments, whereas the sequence of the glycol or of the butanediol with the diacids forms the rigid segments.

A mixture of various polyesters may also be used.

PBT or PLA may advantageously be used in the process according to the invention as polyester resin (c).

According to one embodiment, part of the polyester is substituted with polycarbonate. According to this mode, the term "polyester resin (c)" means a mixture of polycarbonate and polyester.

The melt flow index of the polyester resin (c), measured at 250° C. under 2.16 kg, may range from 2 to 100 and advantageously from 10 to 80.

1$^{st}$ Step: Manufacture of the Mixture (a) and (b)

The first manufacturing step is performed by extrusion of a mixture comprising (a) and (b) at a temperature at which the copolymer (a) is in melt form and at a maximum temperature within the range from 60 to 180° C. and preferentially from 70 to 140° C.

The melting point of the copolymer (a) may be measured by DSC via the method ISO 11357-03.

In this manufacturing step performed by extrusion, the mixture does not essentially comprise any polyester resin (c).

Extrusion is a technique of continuous mixing and transformation of materials. To extrude the mixture, a temperature-regulated sheath inside which rotates at least one endless screw is fed with copolymer (a) and with compound (b). This screw blends and transports the granules towards a die, producing a homogeneous molten mixture by the effect of the heat and the shear. The die gives the plastic mass the desired shape. A granulator may be used at the extruder outlet.

Preferentially, the residence time during the mixing by extrusion is within the range from 10 to 300 seconds and preferentially from 30 to 240 seconds.

Use may be made, for example, of a twin-screw extruder or a single-screw extruder. It is preferred to use a low-shear screw profile during the extrusion, for example by using an extruder of single-screw type.

2$^{nd}$ Step: Manufacture of the Thermoplastic Composition

The manufacture of the thermoplastic composition comprising the copolymer (a), compound (b) and the polyester resin (c) is performed with apparatus for processing thermoplastic polymers in single-screw or twin-screw extruders, blenders or apparatus of the Buss™ Ko-kneader type.

Depending on the polyester used, the maximum temperature of the composition may be within the range from 180 to 320° C.

Preferentially, the second manufacturing step is performed by twin-screw or single-screw extrusion.

The mixture of (a) and (b) may be introduced continuously via a feed hopper.

Surprisingly, the use of this process makes it possible to obtain thermoplastic compositions that have good impact strength properties. Without being bound to any theory, the Applicant explains the good impact properties of the composition by the process according to the invention by good distribution of (a) and (b) in the thermoplastic composition.

Furthermore, by working in this way, the problems of the direct use of pulverulent products in the polyester are solved. Furthermore, since the mixture of (a) and (b) has a less tacky nature than the copolymer (a) alone, the processing apparatus feed problems are also solved.

The thermoplastic composition may also comprise additives to improve some of its properties, such as glivants, antiblocking agents, antioxidants, UV stabilizers or fillers.

The fillers may be glass fibers, flame retardants, talc or chalk. These additives may be added to the composition during the first or second manufacturing step.

EXAMPLES

The following products were used to prepare examples of the composition and of the structures according to the invention:

(a) ethylene-methyl acrylate-glycidyl methacrylate copolymer comprising 25% by weight of acrylate and 8% by weight of glycidyl methacrylate, the melting point of which, measured by DSC (ISO 11357-03), is 65° C.;

(b1): Clearstrength® E920 core-shell compound comprising butadiene, methyl methacrylate and styrene, sold by Arkema;

(b2): Durastrength® D440 core-shell compound comprising 2-ethylhexyl acrylate and methyl methacrylate, sold by Arkema;

polyester (c1): polybutylene terephthalate;
polyester (c2): polylactic acid.

Compositions (1) and (2) according to the invention and comparative compositions (1bis) and (2bis) comprise the constituents (a), (b1), (b2), (c1) and (c2) in the proportions given in Table 1.

Composition (1) was Prepared in 2 Steps:

In a first step, the constituents (a) and (b1) are mixed together in the ratio given in Table 1 by extrusion. The extrusion is performed in an extruder of single-screw type with a diameter of 60 mm and an L/D ratio of 28. The maximum temperature of the mixture is 133° C.

In a second step, said mixture obtained is extruded with the polyester (c1), in the proportions given in Table 1.

Composition (1bis) was Prepared in 2 Steps:

In a first step, the constituents (a) and (b1) are mixed together in the ratio given in Table 1 by extrusion with the same extruder as for composition (1), but this time at a maximum mixture temperature of 198° C.

In a second step, said mixture obtained is extruded with the polyester (c1), in the proportions given in Table 1.

Composition (1ter), which comprises the same constituents as compositions (1) and (1bis) and in the same proportions, was prepared in a single step by mixing the constituents (a), (b1) and (c1) under the same extrusion conditions as in the second step of manufacture of compositions (1) and (1bis).

Composition (2) was also prepared in 2 steps by mixing, in a first step, the constituents (a) and (b2) according to the ratio given in Table 1, the mixing being performed by extrusion under the same conditions as the first step of mixing of composition (1). The maximum mixture temperature is 105° C.

In a second step, this mixture is extruded with the polyester (c2), in the proportions given in Table 1.

Composition (2bis) was prepared in 2 steps by mixing, in a first step, the constituents (a) and (b2) according to the ratio given in Table 1, the mixing being performed by extrusion under the same conditions as the first step of mixing of the composition (1bis). The maximum mixture temperature is 175° C.

In a second step, this mixture is extruded with the polyester (c2), in the proportions given in Table 1.

Composition (2ter) was also prepared in 2 steps by mixing in a first step the constituents (a) and (b2) according to the ratio given in Table 1, the mixing being performed by extrusion under conditions inducing a maximum mixture temperature of 72° C.

In a second step, this mixture is extruded with the polyester (c2), in the proportions given in Table 1.

Composition (2qua), which comprises the same constituents as compositions (2), (2bis) and (2ter) and in the same proportions, was prepared in a single step by mixing the constituents (a), (b2) and (c2) under the same extrusion conditions as the second step of manufacture of compositions (2), (2bis) and (2ter).

The "Charpy notched impact" properties are measured according to standard ISO 179:2000. The higher the Charpy impact value, the better the impact strength. These properties were measured at room temperature (23° C.) and under cold conditions (−20° C. or −40° C.). The values obtained are also given in Table 1.

TABLE 1

| Compositions | Maximum temperature of the mixture of step 1 (° C.) | Mass percentage (a) + (b)/ (a) + (b) + (c) | Mass ratio (a)/(b) | Charpy impact 23° C. | Charpy impact −20° C. | Charpy impact −40° C. |
| --- | --- | --- | --- | --- | --- | --- |
| (1) | 133 | 20% | (3)/(7) | 93 | 75 | Not measured |
| (1bis) | 198 | 20% | (3)/(7) | 43 | 12 | Not measured |
| (1ter) | Not applicable | 20% | (3)/(7) | 86 | 44 | Not measured |
| (2) | 105 | 15% | (1)/(1) | 63 | Not measured | 6 |
| (2bis) | 175 | 15% | (1)/(1) | 47 | Not measured | 5 |
| (2ter) | 72 | 15% | (1)/(1) | 59 | Not measured | 6 |
| (2qua) | Not applicable | 15% | (1)/(1) | 32 | Not measured | 4 |

The compositions prepared via the process according to the invention have improved impact properties in comparison with those obtained using the processes of the prior art.

The invention claimed is:

1. A process for manufacturing a thermoplastic composition comprising:
    a polyester resin (c); and
    a mixture comprising a copolymer (a) of an α-olefin and of an ethylenically unsaturated monomer bearing an epoxy function, and a core-shell compound (b);
wherein said process comprises the steps of:
    a first, manufacturing by extrusion of the mixture (a) and (b) at a temperature at which the copolymer (a) is molten and at a maximum temperature that is within the range from 60 to 180° C.;
    a second, manufacturing said thermoplastic composition by extrusion or by mixing the polyester resin (c) with the mixture (a) and (b) obtained in the first step.

2. The process as claimed in claim 1, in which the step for manufacturing the mixture (a) and (b) of the first step is performed such that the maximum temperature is within the range from 70 to 140° C.

3. The process as claimed in claim 1, in which the step for manufacturing the mixture (a) and (b) of the first step is performed in a single-screw extruder.

4. The process as claimed in claim 1, in which the residence time of the mixture (a) and (b) of the first step is within the range from 10 to 300 seconds.

5. The process as claimed in claim 1, in which the second step for manufacturing the mixture with the polyester resin (c) is performed such that the mixture temperature is within the range from 180 to 320° C.

6. The process as claimed in claim 1, wherein the mass ratio (a)/(b) is within the range from 1/9 to 9/1.

7. The process as claimed in claim 6, wherein the mass ratio (a)/(b) is within the range from 1/4 to 1.5/1.

8. The process as claimed in claim 1, wherein the composition comprises, relative to the total mass of the composition, from 20% to 99% by mass of the polyester resin (c) and from 1% to 80% by mass of the mixture (a) and (b).

9. The process as claimed in claim 1, wherein the polyester resin (c) is selected from the group consisting of polyethylene terephthalate (PET), polybutylene terephthalate (PBT) and the copolyester of ethylene glycol, cyclohexanedimethanol and terephthalic acid (PETG).

10. The process as claimed in claim 1, wherein the polyester resin (c) is selected from the group consisting of polyhydroxyalkonate (PHA) and poly(lactic acid) (PLA).

11. The process as claimed in claim 1, in which part of the polyester of the resin (c) is substituted with polycarbonate.

12. The process as claimed in claim 1, in which the copolymer (a) and the compound (b) are cold-premixed before the first step.

13. The process as claimed in claim 1, in which the shell part of the core-shell compound (b) comprises, in polymerized form:
    an alkyl methacrylate whose alkyl chain comprises from 1 to 12 carbon atoms;
    and/or a vinyl aromatic organic compound comprising from 6 to 12 carbon atoms;
    and/or acrylonitrile;
    this shell part optionally being crosslinked.

14. The process as claimed in claim 1, in which the core part of the core-shell compound (b) comprises, in polymerized form:
    a conjugated diene comprising from 4 to 12 carbon atoms;
    or an alkyl acrylate whose alkyl chain comprises from 1 to 12 carbon atoms.

15. The process as claimed in claim 1, in which the core-shell compound (b) is selected from:
- a compound with a core comprising butadiene and a shell comprising methyl methacrylate or a mixture of methyl methacrylate and styrene;
- a compound with a core comprising 2-ethylhexyl acrylate and a shell comprising methyl methacrylate or a mixture of methyl methacrylate and of styrene;
- a compound with a core comprising butadiene and a shell comprising a mixture of acrylonitrile and of styrene.

16. The process as claimed in claim 1, in which the ratio of the mass of the shell to the mass of the core in said core-shell compound is within the range from 1:1 to 20:1.

17. The process as claimed in claim 1, in which the ethylenically unsaturated monomer bearing an epoxy function is glycidyl methacrylate.

18. The process as claimed in claim 1, in which the copolymer (a) is selected from the copolymer of ethylene and of glycidyl methacrylate and the copolymer of ethylene, an alkyl (meth)acrylate and glycidyl methacrylate.

* * * * *